United States Patent [19]

Rand, Jr.

[11] Patent Number: 4,543,742
[45] Date of Patent: Oct. 1, 1985

[54] ANESTHETIC OR ANTISEPTIC INJECTING FISH HOOK

[76] Inventor: David Rand, Jr., 1900 Palm City Rd., Building 25, Stuart, Fla. 33497

[21] Appl. No.: 620,615

[22] Filed: Jun. 14, 1984

[51] Int. Cl.⁴ .............................................. A01K 83/00
[52] U.S. Cl. .............................................. 43/43.16; 43/6
[58] Field of Search ............... 43/43.16, 42.06, 1, 43/4, 4.5, 44.99, 42.35, 6, 43.4, 5

[56] References Cited

U.S. PATENT DOCUMENTS

| | | | |
|---|---|---|---|
| 2,118,147 | 5/1938 | Blodgett | 43/6 |
| 2,253,125 | 8/1941 | Heineke | 43/43.16 |
| 2,594,387 | 4/1952 | Breuer | 43/43.16 |
| 2,617,359 | 11/1952 | Van Horn | 43/6 |

Primary Examiner—Gene P. Crosby
Attorney, Agent, or Firm—Wolf, Greenfield & Sacks

[57] ABSTRACT

A fish hook has a tubular hollow main body with a retractable hollow needle fitted in its hook end, and a cap at its shank end where the hook attaches to a line. An antiseptic or anesthetic liquid solution is loaded in the main body, through the opening that is closed by the cap. When a fish is hooked, pushing in the needle, the liquid solution is ejected into the fish, enabling the capture of large and small fish alive and unhurt for biological study and to populate aquaria, as well as the catching of game fish.

9 Claims, 5 Drawing Figures

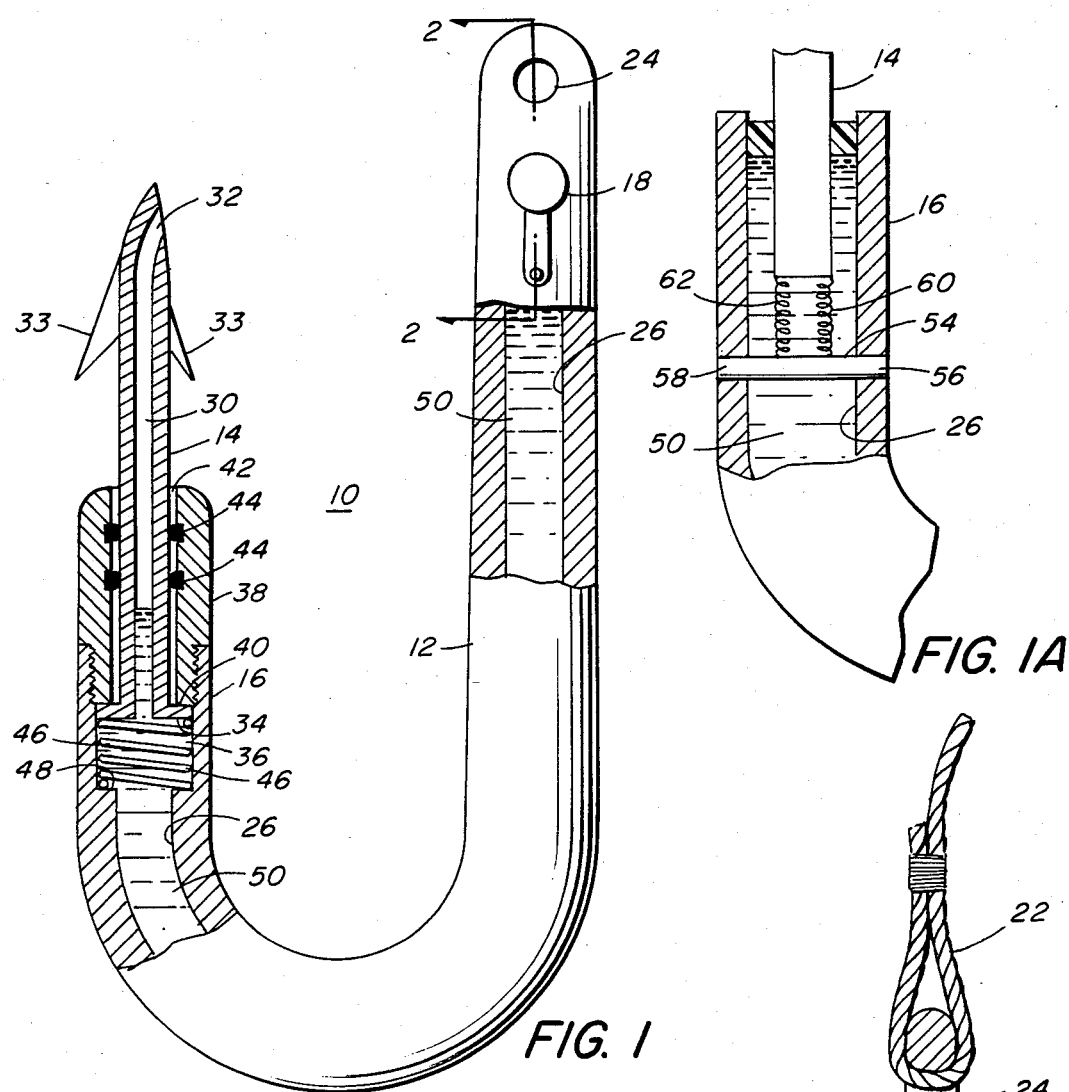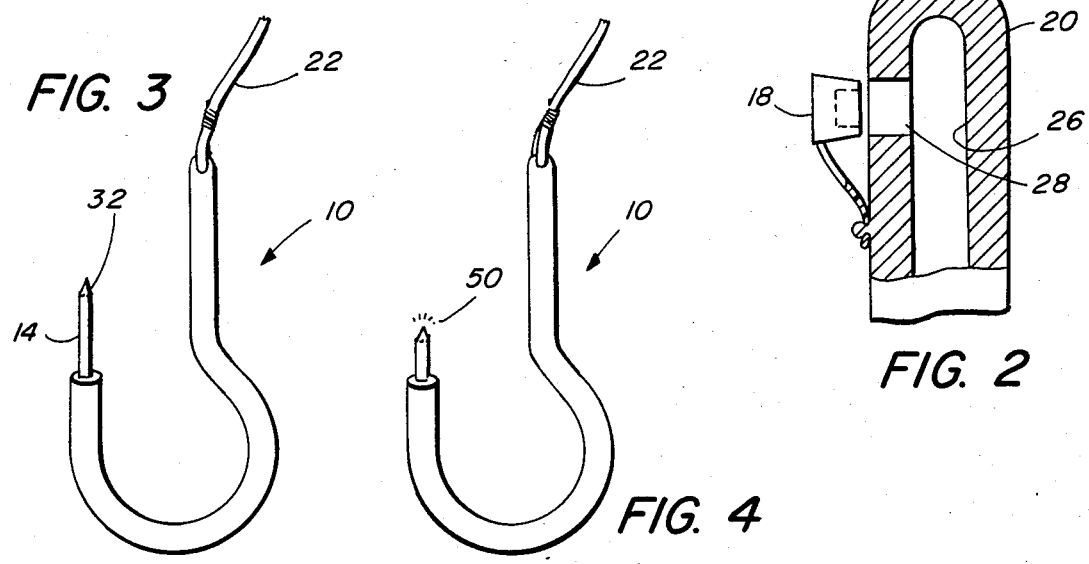

ANESTHETIC OR ANTISEPTIC INJECTING FISH HOOK

BACKGROUND OF THE INVENTION

Generally speaking, fish hooks are designed for catching fish, and little or no attention has been paid to health or humanitarian considerations. If, as usually happens, a fish which takes a baited hook swallows it, there is little chance to remove the hook without further hurting the fish. This has several disadvantages. Fish that are too small to take legally, or that are caught only for sport, frequently cannot survive removal of the hook, and throwing back such fish is an empty gesture.

The risk of injury to the person fishing when trying to remove a swallowed hook is significant. If the hook used is rusty, the fish may become infected bacterially, which adds dangers of tetanus if a person removing the hook is injured, or of infection by reason of eating a fish caught with it.

GENERAL NATURE OF THE INVENTION

For humanitarian and health purposes, and to facilitate catching fish alive for specimen and collection purposes, this invention proposes a fish hook having the capability to inject a fish through the point or barb of the hook so as to anesthetize the fish, or alternatively to render it antiseptic. To this end there is disclosed in this specification, by way of example, a fish hook having a tubular hollow body with a retractable hollow needle fitted in its hook end. The hollow body is charged with an antiseptic or anesthetic solution. When a fish is hooked, the needle is pushed into the hollow body forcing some of the solution into the fish through the needle. Fish hooks according to the invention are particularly suitable for catching large fish for scientific purposes.

Objects of the invention include: to produce a fish hook which can be charged with antiseptic or other medicinal fluid, so that when a fish bites into the hook, the medicinal or antiseptic fluid is injected into the fish, as into its gullet; to prevent harm to the fish; to kill germs and to protect humans from germs or infection carried by the fish; to facilitate the taking of large game fish; and to facilitate the catching of large fish alive and unharmed for scientific purposes.

THE PRIOR ART

A proposal to stun a fish with an electrical charge applied via a fish hook is described in U.S. Pat. No. 1,838,981. A fish hook fitted with an explosive to stun big fish is disclosed in U.S. Pat. No. 2,253,125. A tubular fish hook having a hollow body through which gas bubbles are emitted from the barb-end is shown in U.S. Pat. No. 2,594,387.

BRIEF DESCRIPTION OF THE DRAWINGS

FIG. 1 shows an antiseptic or anesthetic injecting fish hook according to the invention;

FIG. 1A shows an alternative injection structure for FIG. 1;

FIG. 2 shows a detail of FIG. 1;

FIG. 3 shows the hook at the end of a line in the "rest mode" awaiting a fish; and FIG. 4 illustrates the hook in the "injection mode."

DETAILED DESCRIPTION OF THE DRAWINGS

The fish hook 10 has a tubular hollow body 12 with a retractable hollow externally-barbed needle 14 fitted in its hook end 16, and a captive cap 18 at its shank end 20 where the hook attaches to a line 22 via an eye 24. A continuous hollow chamber 26 is enclosed in the hollow body, from the shank end 20 to the hook end 16. An antiseptic or anesthetic solution 50 may be loaded into this chamber via the opening 28 which is closed by the cap 18.

The hollow needle 14 is an elongated tubular member having a passage 30 through it, a sharp end 32 through which the passage opens, one or more barbs 33 on its sides near the end 32, and a seat flange 34 at the other end within a well 36 at the hook end of the hollow chamber 26. A sleeve retainer 38 fitted into the hook end 16, as by threads, as shown, has a shoulder 40 for keeping the needle 14 in the well, and a guide passage 42 into which the needle fits telescopically. A pair of "O" rings 44 provide low-friction guidance for, and liquid seals around, the needle 14. A resilient expansion spring 46 between the seat flange 34 and a shoulder 48 at the bottom of the well 36 urges the needle toward the open end of the well, that is, toward the open end of the hook end 16 of the fish hook. The well 36 and the hollow chamber 26 may be essentially continuous, separated only by the shoulder 48 for supporting the spring 46, as is shown in FIG. 1.

As is shown in FIG. 3, when the fish hook is suspended (in water) at the end of a line 22, the needle 14 projects its maximum length from the hook end 16, but when a fish (not shown) bites down on the sharp end 32 compressing the spring 46 between the seat flange 34 and the well shoulder 48, a charge of the solution 50 is expelled through the end 32 into the fish.

FIG. 1A shows a simplified support structure for the needle 14. A support pin 54 fitted through diametrically-opposed locations 56, 58 in the hook end 16 of the chamber 26 supports two expanded springs 60,62 which are attached to the end 64 of the needle 14 inside the chamber 26. An annular sleeve 64 for the needle 14 seals the hook end of the chamber 26 and guides the needle slidingly in and out of the chamber when a fish bites on its end 32 (not shown in FIG. 2). The springs 60, 62 serve the same function as the spring 46 in FIG. 1.

In use, compression of the needle 14 by biting force on the sharp end 32 is applied to the entire quantity of solution 50 in the chamber 26 and the well 36 at its hook end. The amount of solution 50 that will be ejected from the needle 14 (FIG. 4) when a fish bites down on it may be replaced by refilling the chamber 26 after each use of the hook. The size of the hook, and the quantity of liquid ejected each time it is used, will vary according to the size of the fish intended to be taken. For very large fish, the shank of the hook may be one inch in diameter, although smaller sizes are also contemplated.

While it is preferred to form the chamber as part of the hook, which thickens the shank of the hook to accommodate the chamber 26, the invention contemplates that a separate chamber for the solution 50 may be used, if desired. Such a separate chamber (not shown) would have communication with the well 36. The invention includes such variations and alternative embodiments; the scope of the invention is defined in the appended claims.

I claim:

1. A fish hook having a generally U-shaped main body, the hook end of said body having a tubular well open at said hook end and extending from the hook end into said body, said body having a sealable chamber for holding a charge of liquid, said chamber communicating with said well, an elongated tubular member having an outer sharp end telescopically fitted at its other end into said well with a passage through said tubular member from said well to sharp end, and resilient means for urging said tubular member toward the open end of said well, whereby compression of said resilient means by force applied to said sharp end will eject liquid from said chamber through said sharp end.

2. A fish hook according to claim 1 in which said main body encloses said chamber.

3. A fish hook according to claim 1 in combination with a charge of liquid selected from antiseptic and anesthetic solutions, for injection into a fish when said fish bites or otherwise applies force to said barb.

4. A fish hook according to claim 1 having a removable resealable closure for said chamber.

5. A fish hook according to claim 1 wherein said main body is a hollow tube and said well is at one end of said tube, the remainder of the interior of said tube constituting said chamber.

6. A fish hook according to claim 5 having a removable resealable closure near the other end of said tube.

7. A fish hook according to claim 1 in which said elongated tubular member is held slidably in said well with at least one liquid-sealing ring.

8. A fish hook according to claim 1 including coiled spring means for urging said tubular member toward said open end of said well.

9. A fish hook according to claim 1 including barb means affixed to said tubular member near said sharp end.

* * * * *